(12) United States Patent
Maas et al.

(10) Patent No.: US 8,211,456 B2
(45) Date of Patent: Jul. 3, 2012

(54) METHOD OF MODIFYING MATERIALS SURFACES

(75) Inventors: Joost Hubert Maas, Helmond (NL); Aafke Tessa Ten Cate, 's-Hertogenbosch (NL); Ralf Guillaume Jean Catharina Heijkants, Eindhoven (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 998 days.

(21) Appl. No.: 11/990,544

(22) PCT Filed: Aug. 16, 2006

(86) PCT No.: PCT/NL2006/000423
§ 371 (c)(1),
(2), (4) Date: May 12, 2008

(87) PCT Pub. No.: WO2007/021180
PCT Pub. Date: Feb. 22, 2007

(65) Prior Publication Data
US 2009/0280157 A1    Nov. 12, 2009

(30) Foreign Application Priority Data
Aug. 16, 2005  (EP) .................... 05076894

(51) Int. Cl.
*B05D 3/10* (2006.01)
(52) U.S. Cl. ........ 424/422; 424/423; 424/445; 424/447; 427/302; 427/333; 427/340; 427/372.2; 427/385.5; 427/407.1; 428/411.1; 428/500

(58) Field of Classification Search .................. 424/422, 424/423, 445, 447; 427/302, 333, 340, 372.2, 427/385.5, 407.1; 428/411.1, 500
See application file for complete search history.

(56) References Cited

U.S. PATENT DOCUMENTS
6,465,056 B1 * 10/2002 Chabrecek et al. ........... 427/557
2001/0027237 A1  10/2001 Mayes et al.

FOREIGN PATENT DOCUMENTS
EP     1 095 711 A2    5/2001
EP     1 158 349 A1    11/2001

OTHER PUBLICATIONS

Ľ. Černáková, et al. "Surface Modification of Polypropylene Non-Woven Fabrics by Atmospheric-Pressure Plasma Activation Followed by Acrylic Acid Grafting," Plasma Chemistry and Plasma Processing, vol. 25, No. 4, Aug. 2005.

* cited by examiner

*Primary Examiner* — Roberto Rabago
(74) *Attorney, Agent, or Firm* — Weingarten, Schurgin, Gagnebin & Lebovici LLP

(57) ABSTRACT

The present invention relates to "grafting to" methods of modifying materials surfaces with high-density polymer brushes. A method of the present invention comprises contacting in succession or simultaneously an activated material surface, a solution of a polymeric material having a polymeric backbone with pendant reactive moieties, and a melt of brush-forming terminally-functionalized polymer chains, in order to allow a covalent bonding reaction to occur between surface and polymers, wherein upon completion of the reaction, the polymeric material forms a layer between the material surface and the brush polymer chains.

23 Claims, No Drawings

METHOD OF MODIFYING MATERIALS SURFACES

This application is a §371 national phase filing of PCT/NL2006/000423 filed Aug. 16, 2006, and claims priority to European application No. 05 076 894.4 filed Aug. 16, 2005.

FIELD OF THE INVENTION

The invention relates to methods of modifying materials surfaces. More in particular the present invention relates to methods of making high-density polymer brushes on materials surfaces.

BACKGROUND OF THE INVENTION

The tailoring of material surface properties, such as affinities towards bulk materials, is highly desirable in many applications, in particular in emerging healthcare and microelectronics applications, and involves issues such as colloid stabilization, dewetting and adhesion. In the field of human implants, for instance, there is a growing interest and need for surface modification strategies for controlling the biological interaction between cells or tissues and a device surface.

One way of controlling the surface properties of materials is to deposit a polymer brush thereon. Polymer brushes are created by attaching (grafting) polymers by one end of their chain to a surface at a sufficiently high density so that the chains, with respect to their preferred configuration, substantially stretch away from the surface in order to avoid overlapping of chains. Methods of end-grafting (tethering) polymer chains on surfaces are increasingly being investigated and utilized for modifying the surface properties of materials.

Although variation in the chemical composition of the individual polymers may be used to expand the range of properties of a polymer brush of tethered polymer chains, the properties of the brush mainly depend on the thickness of the brush layer and the grafting density at the material surface. Whereas the thickness of the brush is known to depend strongly on the length of the polymer, the brush grafting density at the material surface is less easy to control and depends strongly on the method used to form the polymer brushes.

End-grafted polymer brushes have been successfully prepared by any of four different techniques:

(1) "grafting to" involves the chemisorption from solution or onto a surface of pre-formed, (mono)end-functionalized polymer chains to form a tethered polymer brush, (2) "grafting from" involves the de-novo generation of the individual polymer chains by monomer polymerization directly at the surface in situ, for example, by using a self-assembled monolayer (SAM) of initiators covalently bonded to the surface as starting points of a radical or anionic polymerization process.

(3) by physisorption of hydrophobically modified polyelectrolyte block copolymers, and (4) by a Langmuir-Blodgett (LB) technique using polymer-based amphiphile.

Whereas the latter two techniques involve physisorption of the brush polymer chains to the surface, the covalent bonding in the "grafting to" or "grafting from" approach generally results in a more stable attachment of the brushes to the surface.

One problem with brushes obtained with the "grafting to" approach is that they generally have a low grafting density and limited thickness because, during the grafting process, initially chemisorbed polymer chains on the surface may shield new incoming chains from accessing the underlying surface due to a variety of intermolecular repulsive interactions (e.g., steric, electrostatic). Therefore, in producing high-density brushes, the "grafting to" procedure has proven to be experimentally much more challenging than the "grafting from" procedure.

The "grafting from" procedure, wherein initiators are immobilized on the surface and polymerization of monomers is initiated therefrom, generally allows for a fairly good control over the production of brushes with large thickness since the length of the polymer (e.g. the number of repeat units in the polymer) may for instance be controlled by adjusting the polymerization time or monomer concentration during growth of the polymer. The "grafting from" procedure also offers a fairly good control over the grafting density of the polymer brush—in the ideal case the grafting density is simply equal to the surface density of the polymerization initiators. While a further advantage of such methods is their ease of use and the ability to prepare brushes from a variety of monomers, a major disadvantage of the "grafting from" procedure is the hard-to-control polymerization process, which usually leads to brushes with broad molecular weight distributions. The "grafting from" procedure is a chain polymerization reaction in which the growth of a polymer chain proceeds exclusively by reactions between monomers and reactive sites on the polymer chain whereby at the end of each growth step reactive sites are regenerated. However, during such reactions, chain transfer usually occurs in which the activity of the kinetic-chain carrier is transferred from the growing macromolecule or oligomer molecule to another molecule or another part of the same molecule, leading to chains of different length, and a concomitant broad molecular weight distribution or high "polydispersity" of the brush.

Surface-initiated "living" radical polymerization procedures, such as the atom transfer radical polymerization (ATRP) procedure (e.g. U.S. Pat. No. 6,407,187), which are by definition free from chain transfer and chain termination, provides in principle for a method that yields polymers with a molecular weight distribution Mw/Mn of <1.5. For many applications, this is still considered as a high polydispersity value. Moreover, the chain length of the brush is not very well defined and the grafting density is not controllable.

SUMMARY OF THE INVENTION

The present inventors have now found a method of preparing a polymer brush which method results in high-density brushes with a narrow molecular weight distribution and which does not suffer from the disadvantages of the prior art methods. The method presented herein is based on the "grafting to" principle.

In a first aspect, the present invention provides a method of preparing a polymer brush on a material surface comprising the steps of:

(a) contacting an optionally (and preferably) activated and optionally (and preferably) functionalized material surface with:

i) a polymeric material having a polymeric backbone with pendant reactive moieties wherein said polymeric material reacts with said activated and optionally functionalized material surface to form on said surface a pre-coat layer of chemisorbed polymeric material having pendant reactive moieties for the covalent bonding of terminally-functionalized polymer chains to said pre-coat layer, or ii) polymerizable monomers under conditions wherein said monomers form a polymeric material having a polymeric backbone with pendant reactive moieties wherein said polymeric material reacts with said activated and optionally functionalized material surface to form on said surface a pre-coat layer of chemisorbed polymeric material having pendant reactive moieties for the covalent bonding of terminally-functionalized polymer chains to said pre-coat layer;

(b) optionally removing unreacted polymeric or monomeric material;

(c) contacting the resultant pre-coat layer with terminally-functionalized polymer chains having at least one terminal functional group, wherein said terminally-functionalized polymer chains are in the form of a melt when contacted with said pre-coat layer, and wherein said at least one terminal functional group reacts with at least one pendant reactive moiety to provide for tethered polymer chains covalently bonded to said pre-coat layer of polymeric material, and optionally removing unreacted polymer chains.

In a preferred embodiment of such a method, the polymeric material comprises at least one pendant reactive moiety per monomer.

In another preferred embodiment, the pendant reactive moieties are carboxyl moieties, wherein said at least one terminal functional group is the amine group, and wherein said material surface is functionalized with an aminoalkylsilane group. Even more preferably, the polymeric material is a polyacrylic acid or a derivative thereof, wherein said terminally-functionalized polymer chains are functionalized, and wherein said material surface is functionalized with 3-aminopropyltriethoxysilane.

In yet another preferred embodiment, the terminally-functionalized polymer chains are polymethacrylates chains, optionally further functionalized with methyl or ethyl quaternary ammonium chloride side groups.

In yet another preferred embodiment, the terminally-functionalized polymer chains are degradable polymer chains.

In yet another preferred embodiment, the method further comprises the steps of providing the tethered polymer chains with a controlled release functionality, preferably by chemisorbing or physisorbing a medicament to said tethered polymer chains.

In yet another preferred embodiment, the polymeric material is provided in the form of a solution in order to react with said activated and optionally functionalized material surface.

In still another preferred embodiment, the melt consists of polymers having a molecular weight distribution equivalent to an Mw/Mn ratio of between 1.0 and 1.4. The lower value of 1.0 being the theoretically lowest attainable polydispersity value. The upper value of the polydispersity of the polymers in the melt is more preferable 1.35, still more preferably 1.30, even more preferably 1.25, 1.20, 1.15, 1.10, 1.09, 1.08, 1.07, 1.06, 1.05, 1.04, 1.03, most preferably 1.02.

To manufacture polymer chains of low polydispersity, for instance having a polydispersity of about 1.1, anionic polymerization methods may be used that yield homopolymers in solution. Such methods are well within reach of the skilled person (see for instance: 'Polymers: Chemistry and Physics of Modern Materials' 2nd edn., J M G Cowie, Cheltenham, Stanley Thornes, 1998). The terminal functionalization is preferably introduced to the chains upon completion of their formation. After removal of the solvent, the polymers may be retrieved as a powder or an oil of varying viscosity. The melt as used in the methods of the present invention is produced by heating the powder or oil thus obtained to a temperature above the glass transition temperature of the brush polymer but below the degradation temperature of the brush polymer. Suitable brush polymers of well defined length may also be obtained from commercial sources. Polymers having Mw/Mn ratio's of 1.08 may for instance be commercially obtained from Polymer Source Inc., Canada. Suitable brush polymers may also be obtained in terminal (mono)functionalized forms such as in the form of amino-functionalized polyethylene oxide chains. Depending on the initiator used in the anionic polymerization methods used in the manufacture of the brush polymers, additional terminal groups may be present in the chain. For instance, an amino-functionalized polyethylene oxide chain may comprise a terminal methoxy. This second functionality may or may not be present in the brush polymers used in a method of the present invention, as long as the second functionality does not interfere with the formation of the brush as described herein.

In a further aspect, the present invention provides a polymer brush on a material surface obtainable by a method according to the present invention.

In still a further aspect, the present invention provides a polymer brush on a material surface, said polymer brush consisting of tethered polymer chains covalently bonded to a layer of polymeric material positioned in between said tethered chains and said surface, wherein a plurality of tethered chains is bonded to a single polymer molecule of said polymeric material. The tethered chains in the polymer brush have a molecular weight distribution of between 1.0 and 1.5 Mw/Mn, preferably between 1.03 and about 1.3 Mw/Mn, or any value stated above as preferred for the polymers in the melt. The polymer brush has a stretched conformation of preferably between 50 and 100%, more preferably between 70% and 95%, where 100% is the fully stretched chain. The polymer brush of the present invention typically has a polymer density of between 0.5 $nm^{-2}$ and 2 $nm^{-2}$, preferably between 0.8 $nm^{-2}$ and 1.5 $nm^{-2}$. It is a feature of the present invention that the brush is capable of having the various quantitative characteristics of density, polydispersity and/or stretched conformation in combination, i.e. a polymer brush of the invention may for instance combine a molecular weight distribution Mw/Mn of between 1.0 and 1.4, with a polymer density of between 0.5 $nm^{-2}$ and 2 $nm^{-2}$.

An advantage of the method of the present invention is that the brush polymers are immobilized to the pre-coat coated surface in non-swollen state, which allows for higher grafting densities. In contrast to the methods of the prior art wherein polymer chains of the brush are immobilized to the surface in swollen globular conformation as a result of the fact that they are in a dissolved state and contacted with the surface in the form of a solution, in a method of the present invention the brush chains are immobilized in essentially non-swollen state due to the fact that they are contacted with the surface from or in the form of a melt. Since the volume of a single polymer is reduced in this way, the present method allows for higher grafting densities.

A further advantage of the use of a pre-coat layer in aspects of the present invention is that this allows for the modification of numerous types of surfaces with a polymer brush, thus altering the surface properties of a wide variety of materials.

In a preferred embodiment of such a polymer brush, the polymeric material is derived from acrylic acid.

In another preferred embodiment of a polymer brush of the invention, the covalent bond between said polymeric material and said tethered chains is the amide bond.

In yet another preferred embodiment, the tethered polymer chains are selected from the group consisting of hydrocarbon polymers, polyacrylates, polyethers, polyesters, polycarbonate, polysulfone, polyamides, polyimides, polyurethane, polysiloxanes, cellulose, polypeptides and derivatives, copolymers thereof. More preferred are polyethers, polyacrylates and polyesters. Polyethylene oxide is most preferred.

In yet another preferred embodiment, the tethered polymer chains are obtained by end-grafting polymethacrylates functionalized with methyl or ethyl quaternary ammonium chloride side groups.

In yet another preferred embodiment, the tethered polymer chains are degradable and adapted for controlled release of medicaments. Preferably, the material surface is part of a wound dressing or stent.

DETAILED DESCRIPTION OF THE INVENTION

"Multifunctional" in the context of a polymer used in the invention means a polymer having 3 or more functional groups contained therein, where the functional groups may be the same or different. Multifunctional polymers of the invention will typically contain from about 3-100,000 functional groups, or from 3-50,000 functional groups, or from 3-25,000 functional groups, or from 3-15,000 functional groups, or from 3 to 10,000 functional groups, or will contain 3, 4, 5, 6, 7, 8, 9 or 10 functional groups within the polymer backbone. A "difunctional" polymer means a polymer having two functional groups contained therein, either the same (i.e., homodifunctional) or different (i.e., heterodifunctional). "Heterofunctional" in the context of a polymer used in the invention means a polymer having at least 2 different functional groups contained therein.

"Forked," in reference to the geometry or overall structure of a polymer, refers to a polymer having one polymer "stem" and two, preferably parallel polymer "arms" attached (either directly or through one or more atoms) to an atom of the "stem" serving as a branching atom.

"Branched," in reference to the geometry or overall structure of a polymer, refers to polymer having 2 or more polymer "arms." A branched polymer may possess 2 polymer arms, 3 polymer arms, 4 polymer arms, 6 polymer arms, 8 polymer arms or more. One particular type of highly branched polymer is a dendritic polymer or dendrimer, which, for the purposes of the invention, is considered to possess a structure distinct from that of a branched polymer. A "dendrimer" or dendritic polymer is a globular, size monodisperse polymer in which all bonds emerge radially from a central focal point or core with a regular branching pattern and with repeat units that each contribute a branch point. Dendrimers exhibit certain dendritic state properties such as core encapsulation, making them unique from other types of polymers, including branched polymers. Dendritic polymers are less suitable for the formation of polymer brushes.

A "melt" in the context of a polymer used in the invention means a preferably liquid polymer composition wherein the polymer is at a temperature above its characteristic glass transition temperature and below its degradation temperature. The term (polymer) melt as used herein refers to a constitution of pure polymer (as a homopolymer or mixture), preferably in liquid or semi-liquid form, at a temperature above the glass transition temperature of the polymer. When the polymer is cooled below this temperature, it becomes hard and brittle. Above this temperature it is soft and flexible. Above the glass transition temperature there is enough thermal energy available to allow torsion angle changes and mobility of the molecules.

The term "autophobic" is the dislike of melt chains for the chemically identical brush chains.

A "surface" as the term is used herein is meant to include an "interface" as a type of surface formed by the common boundary between adjacent regions, bodies, substances, or phases.

The term "alkyl", as used herein, unless otherwise specified, refers to a saturated straight, branched, or cyclic, primary, secondary, or tertiary hydrocarbon of $C_1$ to $C_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The alkyl group can be optionally substituted with one or more moieties selected from the group consisting of hydroxyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991.

The term "protected" as used herein and unless otherwise defined refers to a group that is added to an oxygen, nitrogen, or phosphorus atom to prevent its further reaction or for other purposes. A wide variety of oxygen and nitrogen protecting groups are known to those skilled in the art of organic synthesis. Suitable protecting groups are well known to those skilled in the art, and include trimethylsilyl, dimethylhexylsilyl, t-butyldimethylsilyl, and t-butyldiphenylsilyl, trityl or substituted trityl, alkyl groups, acyl groups such as acetyl and propionyl, methanesulfonyl, and p-toluenesulfonyl.

The term "aryl", as used herein, and unless otherwise specified, refers to phenyl, biphenyl, or naphthyl, and preferably phenyl. The aryl group can be optionally substituted with one or more moieties selected from the group consisting of hydroxyl, amino, alkylamino, arylamino, alkoxy, aryloxy, nitro, halo, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991.

The term "alkene", as referred to herein, and unless otherwise specified, refers to a straight, branched, hydrocarbon of $C_2$ to $C_{20}$ with at least one double bond.

The term "acyl" refers to moiety of the formula —C(O)R$_3$, wherein R$_3$ is alkyl; aryl, alkaryl, aralkyl, heteroaromatic, alkoxyalkyl including methoxymethyl; arylalkyl including benzyl; aryloxyalkyl such as phenoxymethyl; aryl including phenyl optionally substituted with halogen, C1 to $C_4$ alkyl or $C_1$ to $C_4$ alkoxy, or the residue of an amino acid. In one embodiment, the acyl group is the residue of a saturated or unsaturated fatty acid. As used herein the term fatty acid refers to a long chain ($C_6$ to $C_{26}$) aliphatic carboxylic acid, including saturated and unsaturated acids, including ahydroxy fatty acids. Non-limiting examples of fatty acids are lauric, oleic, caproic, linoleic, linolenic, caprylic, capric, perlargonic, neononanoic, neodecanoic, palmitelaidoic, myristic, palmitic, stearic, arachidic, behenic, lignoceric, heptanoic, nonanoic, undecanoic, tridecanoic, pentadecanoic, heptadecanoic, nonadecanoic, heneicosanoic, tricosanoic, arachidonic, docosahexanoic, elaidic, erucic, nervonic, palmitoleic and petriselinic acid.

The term "amino acid" includes naturally occurring and synthetic amino acids, and includes but is not limited to, alanyl, valinyl, leucinyl, isoleucinyl, prolinyl, phenylalaninyl, tryptophanyl, methioninyl, glycinyl, serinyl, threoninyl, cysteinyl, tyrosinyl, asparaginyl, glutaminyl, aspartoyl, glutaroyl, lysinyl, argininyl, and histidinyl.

The term "halo", as used herein, includes chloro, bromo, iodo, and fluoro.

A method of the present invention comprises—in short—contacting in succession or simultaneously an activated material surface, a solution of a polymeric material having a polymeric backbone with pendant reactive moieties, and a melt of brush-forming terminally-functionalized polymer chains, in order to allow a covalent bonding reaction to occur between surface and polymers, wherein upon completion of the reaction, the polymeric material forms a layer between the material surface and the brush polymer chains.

Material Surface

It is a particular advantage of the present invention that a wide variety of materials surfaces may be modified by application thereto of a polymer brush according to the present invention. The material surface as used herein may be an organic or inorganic material surface. Suitable surface materials include but are not limited to organic or inorganic (polymeric) materials, such as polyamide, vinyl chloride, vinyl acetate, polyurethane, melamine, polyimide, polystyrene, polyacryl, polyamide, acrylate butadiene styrene (ABS), Barnox, PVC, nylon, EVA, PET, cellulose nitrate, cellulose acetate, mixed cellulose ester, polysulfone, poly-ether sulfone, polyvinylidene fluoride (PVDF) or polytetrafluoroethylene (PFTE or Teflon®), polyethylene, polypropylene, polycarbonate, and silicone or combinations thereof. The material may also consist of silicon or silicon oxide, glass (e.g. as microfibres) or metals such as aluminium, chromium, silver, gold, copper, nickel, platinum, titanium, zirconium, cobalt, vanadium or oxides thereof. Also, these materials can be used singly or as a mixture of two or more kinds of them such as in the form of alloys or ceramics (e.g. hydroxyapatite or calcium phosphate ceramics such as bicalcium phosphate (BCP) or tricalcium phosphate (TCP)). Suitable materials further include textiles or synthetic or natural fibre-based materials. The material may exhibit any form or shape and may for instance be in the form of a sheet, bead, granule, rod, fibre, foam or tube, and may be rigid, flexible or elastic.

If necessary, the material surface may be activated by any method known in the art, such as known surface activation techniques, including for instance corona treatment, oxygen plasma, argon plasma, selective plasma bromination, chemical grafting, allyl chemistry, chemical vapour deposition (CVD) of reactive groups, plasma activation, sputter coating, etching, or any other known technique. For instance in the case of a glass surface, such an activation is usually not required as such a surface is herein considered already activated. The purpose of the activation of the surface is to provide for a surface suitable for the covalent attachment of a surface-modifying functionality or (directly) of a pre-coat polymer. Following its optional activation, the surface may be further functionalized. The purpose of the functionalization of the surface is to provide for functional groups suitable for the covalent attachment of a pre-coat polymer.

The skilled person is well aware of the various possibilities of attaching polymers to optionally activated surfaces. These techniques generally involve the introduction of amino-, silane-, thiol-, hydroxyl- and/or epoxy-functionalities to the surface, and the subsequent attachment thereto of the polymer.

The functionalization may also comprise the introduction of spacers or linker to the surface for the attachment of the pre-coat polymer to the surface at a predetermined distance. A suitable spacer is for instance an alkylation by reacting the surface with for instance aminoalkylsilane.

When referring to such an embodiment of an aminoalkyl-silanization of a material surface in more general terms, a method of preparing a polymer brush on a material surface according to one embodiment of the present invention may also be described as to employ bifunctional monomers that act as linking agents and link the polymeric material to the activated material surface. In such an embodiment, a method of the invention may comprise the steps of:

(a) treating an activated material surface with a solution of a bifunctional monomer to provide surface-adsorbed monofunctional monomer;

(b) removing unadsorbed monomer;

(c) contacting the treated surface with a solution comprising a polymeric material having a polymeric backbone with pendant reactive moieties, wherein said polymeric material reacts with said bifunctional monomer adsorbed on said material surface to form a pre-coat layer of polymeric material and to provide pendant reactive moieties for covalent bonding thereto of terminally-functionalized polymer;

(d) removing unreacted polymeric material;

(e) contacting the resultant pre-coat layer with terminally-functionalized polymer chains, wherein said terminally-functionalized polymer chains are in the form of a melt when contacted with the pre-coat layer, and wherein said terminally-functionalized polymer chains react with said pendant reactive moieties to provide for tethered polymer chains covalently bonded to said pre-coat layer of polymeric material, and optionally removing unreacted terminally-functionalized polymer chains.

Very suitably, the bifunctional monomer may have two different chemical functionalities, such that one functionality is capable of reacting with the activated materials surface and the other is capable of reacting with at least one type of pendant functionalized groups of the polymeric material.

In stead of first treating a material surface with a solution of a water soluble bifunctional monomer to provide surface-adsorbed monofunctional monomer, a method of preparing a polymer brush on a material surface according to the present invention may, in an alternative embodiment, also comprise the steps of:

(a) contacting a bifunctional monomer with an excess of polymeric material having a polymeric backbone with pendant reactive moieties, wherein said polymeric material reacts with said bifunctional monomer to form a polymeric material/monofunctional monomer complex wherein said polymeric material has remaining pendant reactive moieties for covalent bonding thereto of terminally-functionalized polymer;

(b) treating an activated material surface with a solution of the resultant polymeric material/monofunctional monomer complex to provide a surface-adsorbed pre-coat layer of the polymeric material;

(c) removing unreacted complex;

(d) contacting the resultant pre-coat layer with terminally-functionalized polymer chains wherein said terminally-functionalized polymer chains react with said remaining pendant reactive moieties to provide for tethered polymer chains covalently bonded to said pre-coat layer of polymeric material, wherein said terminally-functionalized polymer chains are in the form of a melt when contacted with the pre-coat layer, and wherein said method further comprises the step of optionally removing unreacted polymer chains.

Brush Polymers

An important aspect of the brushes of the present invention is formed by the terminally-functionalized polymer chains. Upon completion of a process of the invention the tethered polymer chains form a polymer brush layer, where chains are stretched away from the material surface due to the excluded volume effect, thereby forming the bristles of the brush. These polymers are therefore also addressed herein as the brush polymers.

Brush polymers useful in the present invention are selected from compounds and polymers generally well-known in the art and the polymers may have the form of a comb, forked, branched or straight chain, but are preferably straight chain polymers.

The brush polymers may be hydrophilic or hydrophobic, and may be homopolymers or copolymers, such as block copolymers. The brush may consist of polymer chains of a single type of polymer or may take the form of a binary brush of two different polymers, such as to form a mixed polymer brush comprising hydrophilic and hydrophobic polymers. The brush may even consist of more than two types of brush polymers. The different polymers in such mixed brushes may be miscible or immiscible with each other, preferably immiscible.

Any of a large variety of hydrophobic and hydrophilic polymers can be used as brush polymers. Suitable hydrophobic brush polymers are polymers such as, but not limited to, polysiloxane, perfluoropolyether, polystyrene, polyoxypropylene, polyvinylacetate, polyoxybutylene, polyisoprene, polybutadiene, polyvinylchloride, polyalkylacrylate, polyalkylmethacrylate, polyacrylonitrile, polypropylene, PTHF, polymethacrylates, polyacrylates, polysulfones, polyvinylethers, and polypropylene oxide), and copolymers thereof. Suitable hydrophilic brush polymers are polymers, such as, but not limited to, polyoxazoline, polyethylene glycol, polyethylene oxide, polyvinyl alcohol, polyvinylpyrrolidone, polyacrylamide, poly(meth)acrylic acid, polyethylene oxide-co-polypropyleneoxide block copolymers, poly(vinylether), poly(N,N-dimethylacrylamide), polyacrylic acid, polyacyl alkylene imine, polyhydroxyalkylacrylates such as hydroxyethyl methacrylate (HEMA), hydroxyethyl acrylate, and hydroxypropyl acrylate, polyols, and copolymeric mixtures of two or more of the above mentioned polymers, natural polymers such as polysaccharides and polypeptides, and copolymers thereof, and polyionic molecules such as polyallylammonium, polyethyleneimine, polyvinylbenzyltrimethylammonium, polyaniline, sulfonated polyaniline, polypyrrole, and polypyridinium, polythiophene-acetic acids, polystyrenesulfonic acids, zwitterionic molecules, and salts and copolymers thereof.

Segmented copolymers can also be used as a brush polymer, and may comprise one or more hydrophobic segments alternated by one or more hydrophilic segments, or vice versa. A hydrophilic segment preferably contains a predominant amount of hydrophilic monomers. A hydrophobic segment preferably contains a predominant amount of hydrophobic monomers. Suitable hydrophobic monomers are for instance $C_1$-$C_{18}$ alkyl and $C_3$-$C_{18}$ cycloalkyl acrylates and methacrylates, $C_3$-$C_{18}$ alkylacrylamides and methacrylamides, acrylonitrile, methacrylonitrile, vinyl $C_1$-$C_{18}$ alkanoates, $C_2$-$C_{18}$ alkenes, $C_2$-$C_{18}$ haloalkenes, styrene, (lower alkyl)styrene, $C_4$-$C_{12}$ alkyl vinyl ethers, $C_2$-$C_{10}$ perfluoro-alkyl acrylates and methacrylates and correspondingly partially fluorinated acrylates and methacrylates, $C_3$-$C_{12}$ perfluoroalkylethylthiocarbonylaminoethyl acrylates and methacrylates, acryloxy- and methacryloxyalkylsiloxanes, N-vinylcarbazole, $C_1$-$C_{12}$ alkyl esters of maleic acid, fumaric acid, itaconic acid, mesaconic acid, vinyl acetate, vinyl propionate, vinyl butyrate, vinyl valerate, chloroprene, vinyl chloride, vinylidene chloride, vinyltoluene, vinyl ethyl ether, perfluorohexyl ethylthiocarbonylaminoethyl methacrylate, isobornyl methacrylate, trifluoroethyl methacrylate, hexafluoroisopropyl methacrylate, hexafluorobutyl methacrylate, tristrimethylsilyloxysilylpropyl methacrylate (TRIS), and 3-methacryloxypropylpentamethyldisiloxane. Suitable hydrophilic monomers are hydroxyl-substituted lower alkyl acrylates and methacrylates, acrylamide, methacrylamide, (lower alkyl)acrylamides and methacrylamides, N,N-dialkylacrylamides, ethoxylated acrylates and methacrylates, polyethyleneglycol-mono methacrylates and polyethyleneglycol-monomethylether methacrylates, hydroxyl-substituted (lower alkyl)acrylamides and methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)— (where the term amino also includes quaternary ammonium), mono(lower alkylamino)(lower alkyl) and di(lower alkylamino)(lower alkyl)acrylates and methacrylates, allyl alcohol, 3-trimethylammonium 2-hydroxypropylmethacrylate chloride, dimethylaminoethyl methacrylate (DMAEMA), dimethylaminoethylmethacrylamide, glycerol methacrylate, and N-(1,1-dimethyl-3-oxobutyl)acrylamide. The weight average mean molecular weight of one segment in a segmented copolymer may be in the range from about 10 to about 500,000, preferably in the range from about 500 to about 25,000, more preferably in the range of about 100 to 5,000, particularly preferably in the range from about 500 to about 1,000.

The brush polymers used herein may have a molecular weight of about 50 to about 5,000,000 number average mean molecular weight (Mn) as may be determined by for instance vapour phase osmometry or end-group titration, well known to the skilled persons.

The brush polymers may be obtained from commercial sources or may be prepared in advance from monomers by using standard polymerization reactions well known in the art. After their synthesis, one or more particular polymers of a predetermined molecular weight may be purified such as to provide for a batch of brush polymers with narrow molecular weight distribution. For instance, preparative gel permeation chromatography (GPC) or size exclusion chromatography may be used for the fractionation of polymers to isolate specific size fractions of polymers or to simplify matrices, but other techniques such as selective dissolution or crystallization are also possible for purification. Polymer characterization methods suitable for measuring polydispersity are for instance described in Polymers: Chemistry and Physics of Modern Materials J. M. G Cowie, vide supra)

The brush polymers may for instance be prepared from an alkyl ester monomer of acrylic or methacrylic acid. These esters can be represented by the general formula:

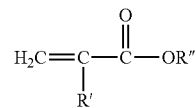

wherein R' is a hydrogen atom or a methyl group and R" is an alkyl group having from one to eight carbon atoms. Such esters include methyl, ethyl, propyl, isopropyl, butyl, isobutyl, amyl, isoamyl, hexyl, heptyl, 2 ethylhexyl, and octyl acrylates and methacrylates.

In addition to the above acrylate or methacrylate ester monomer, the brush polymers may for instance comprise other ethylenically unsaturated monomers which are polymerizable therewith. Examples of these monomers include styrene, vinyl toluene, vinyl acetate, vinyl propionate, vinyl butyrate, vinyl laurate, vinyl oleate, vinyl stearate, and the other vinyl esters of fatty acids having from 1 to 18 carbon atoms. Also, the various esters of polymerizable acids such as crotonic acid, fumaric acid, itaconic acid and maleic acids may be utilized.

Acrylonitrile, methacrylonitrile, acrylamide, methacrylamide, 2 methylstyrene, allyl acetate, glycidyl methacrylate, t-butylaminoethyl methacrylate, hydroxyalkyl acrylates or methacrylates, such as hydroxyethyl methacrylate, hydroxypropyl methacrylate or acrylate, hydroxyethyl vinyl ether, hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene and the like can also be used as the comonomers in brush polymers.

Generally any ethylenically unsaturated aliphatic hydroxy-containing monomer may be utilized in the instant invention. However, more preferred are the hydroxy acrylates and methacrylates having the general formula:

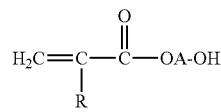

wherein R is a hydrogen atom or methyl group and A is an alkylene group containing two to six carbon atoms. Examples of these monomers are hydroxyethyl acrylate or methacrylate, hydroxypropyl acrylate or methacrylate, and hydroxyhexyl acrylate or methacrylate. Generally, these monomers can be prepared by reacting epoxide-containing molecules, such as propylene oxide or ethylene oxide, with polymerizable acids, such as methacrylic or acrylic acid.

In addition to, or in stead of, the hydroxy-containing monomer an ethylenically unsaturated polymerizable acid-containing monomer may be used. Preferably this monomer is selected from the group consisting of acrylic acid, methacrylic acid, crotonic acid, and itaconic acid, although other acids can also be utilized.

Illustrative of polymers useful in the practice of this invention either as is or after modification are homopolymers and copolymers of ethylenically unsaturated monomers, e.g., styrene, substituted styrene, alkyl acrylates, alkyl methacrylates, vinyl esters, vinyl ethers, butadienes, vinyl chloride, vinylidene chloride, acrylonitrile, methacrylonitrile, acrylamide, isopropenyl oxazoline, vinyl benzyl chloride and C2 to C10 alkenes. Preferred as comonomers in such vinyl addition polymers are acrylonitrile, ($C_1$ to $C_{20}$ alkyl)acrylates, ($C_1$ to $C_{20}$ alkyl)methacrylates, hydroxyalkyl methacrylates, p-tert-butylstyrene, p-tert-butyl((-methyl)styrene, dicyclopentenyl acrylate, dicyclopentenyl methacrylate, styrene sulfonic acid, styrene sulfonamide, 2-sulfoethyl methacrylate, vinyl acetate, acrylamide, alkyl cyanoacrylate, methacrylamide, butadiene, isoprene vinyl pyrrolidone and vinyl benzyl chloride and its derivatives. Preferred polymers include ethylene/acrylic acid copolymer, ethylene/methacrylic acid copolymer, EPD rubber, polypropylene, poly(4-methyl-pentene-1), ethylene/vinyl acetate copolymer, ethylene/vinyl alcohol copolymer, styrene/acrylonitrile copolymer, styrene/methacrylic acid copolymer, acrylonitrile/butadiene/styrene terpolymer, styrene/isopropenyl oxazoline copolymer, styrene/maleic acid copolymer, styrene/acrylic acid copolymer and vinyl chloride/vinyl acetate copolymer.

Yet other illustrative of polymers useful in the practice of this invention include poly(ethylene oxide) (PEO).

Straight or branched $C_4$ to $C_{22}$ alkyl chains may also serve as terminally-functionalized polymer chains useful in aspects of the present invention. Suitable terminally-functionalized polymer chains may therefore also comprise terminally-functionalized butyl, isobutyl, t-butyl, pentyl, isopentyl, neopentyl, hexyl, isohexyl, 3-methylpentyl, 2,2-dimethylbutyl en 2,3-dimethylbutyl, heptyl, octyl, nonyl, decyl, undecyl, dodecyl, tridecyl, tetradecyl, pentadecyl, hexadecyl, heptadecyl, octadecyl, nonadecyl, eikosyl, heneikosyl en dokosyl and isomers thereof.

De terminally-functionalized $C_4$ tot $C_{22}$ alkyl chains may be optionally substituted with one or more groups selected from group consisting of hydroxyl, amino, alkylamino, arylamino, alkoxy, aryloxy, nitro, cyano, sulphonic acid, sulphate, sulphonate, phosphonate of phosphate, both protected and unprotected as required. A highly preferred brush polymer is 1-octadecylamine (Melting point [Mp] 47-53° C.), in which the amine-group serves as the terminal reactive nucleophilic moiety, the function of which is as described hereinbelow.

The brush polymers are terminally-functionalized for immobilization purpose, whereas they may further be functionalized to adjust the properties of the brush. Polymers such as polymethacrylates, or any other suitable polymer, may be functionalized with methyl or ethyl quaternary ammonium chloride side-groups. Such a functional group-modified brush polymer is highly preferred as it shows in addition to the dewetting or autophobic properties of the brush itself an antimicrobial activity for specific bacteria. The thus obtained autophobic material surface with antimicrobial functionality is a particularly preferred embodiment of the present invention.

Pre-Coat Layer Polymers

The polymeric material having a polymeric backbone with pendant reactive moieties forms another important aspect of the brushes of the present invention. Upon completion of a method of the invention the polymeric material forms a coating layer between the tethered polymer chains of the polymer brush and the material surface, wherein the polymeric material is covalently attached to the material surface and wherein the polymer chains of the polymer brush are covalently attached to the polymer backbone of the polymeric material. Preferably, the coating layer is positioned onto the material surface prior to the attachment of the polymer chains of the polymer brush thereto so as to form a pre-coating of the surface. The polymers of the polymeric material are therefore also addressed herein as the pre-coat polymers.

The polymeric material having a polymeric backbone with pendant reactive moieties may be bonded directly to the activated surface or via a functional group or linker moiety, and a portion of the reactive moieties pendant from the polymeric backbone may participate in the bonding to the surface, while a remaining portion of reactive moieties is available for covalent bonding of terminally-functionalized polymer.

Very suitably, the polymeric material may have pendant reactive moieties of two or more different chemical structures (i.e. the polymer is heterofunctional), such that one type of reactive moieties is capable of reacting with the activated materials surface and at least another type of reactive moieties is capable of reacting with the terminally-functionalized polymer.

The polymer may be of a substantially pure polymer or may be blends of different polymers. The polymer can be a block copolymer.

The pre-coat polymers are typically multifunctional so that multiple brush polymers can be made pendant from the backbone of a single pre-coat polymer after completion of a bonding reaction between the two. Pre-coat layer polymeric material may include both addition and condensation polymers containing an average of more than one reactive moiety, preferably at least one reactive moiety per backbone monomer. The reactive moiety may be part of the polymer chain, pendant from but bonded to the chain, bonded to the ends of the chain or part of a pendant moiety bonded to the chain. The polymer may, for instance, be a water-soluble polyelectrolyte or ionomer, a water-dispersible polyelectrolyte, or a water-insoluble polymer which is suitable as a support for the brush polymers.

The pre-coat polymer may suitably be a cationic or anionic polyelectrolyte, preferably a anionic polyelectrolyte is used. Amphoteric polyelectrolytes may also be employed. The cationic polyelectrolyte is preferably a polymer with cationic groups distributed along the molecular chain. The cationic groups may be disposed in side groups pendant from the chain or may be incorporated in it. Examples of cationic polyelectrolytes include: Copolymers of vinyl pyrollidone and quaternary methyl methacrylate e.g., the vinylpyrrolidone-methacrylate copolymer Gafquat® series (755N, 734, HS-100); substituted polyacrylamides; polyethyleneimine, polypropyleneimine and substituted derivatives; polyamine homopolymers; polyamine co-polymers (e.g., condensates of epichlorohydrin and mono or dimethylamine); polydiallyl dimethyl ammonium chloride (polyDADMAC); substituted dextrans; modified guar gum (substituted with hydroxypropytrimonium chloride); substituted proteins (e.g., quaternary groups substituted on soy protein and hydrolysed collagen); polyamino acids (e.g., polylysine); low molecular weight polyamino compounds (e.g., spermine and spermidine). Natural or artificial polymers may be employed. Cationic polyelectrolytes with Mw 150 to 5,000,000, preferably 5000 to 500,000, more preferably 5000 to 100,000 may be employed.

The anionic polyelectrolyte is preferably a polymer with anionic groups distributed along the molecular chain. The anionic groups, which may include carboxylate, sulfonate, sulphate or other negatively charged ionisable groupings, may be disposed upon groups pendant from the chain or bonded directly to the polymer backbone. Natural or artificial polymers may be employed. Examples of anionic polyelectrolytes include: copolymers of methyl vinyl ether and maleic anhydride e.g., the Gantrez® S-series or AN-series; alginic acid and salts; carboxymethyl celluloses and salts; substituted polyacrylamides (e.g. substituted with carboxylic acid groups); polyacrylic acids and salts; polystyrene sulfonic acids and salts; dextran sulphates; substituted saccharides e.g., sucrose octosulfate; heparin. Anionic polyelectrolytes with Mw of 100 to 5,000,000 may be used, preferably 5000 to 500,000, more preferably 5000 to 100,000. Preferred pendant reactive moieties are carboxyl moieties, as will be described in more detail below, and a most preferred polymer for the pre-coat layer of the polymer brush of the invention is polyacrylic acid. The term polyacrylic acid or acrylic acid polymers is used to encompass a variety of polymers having high percentages of polymerizable monomers therein with pendant carboxylic acid groups or anhydrides of polycarboxylic acid. These are described in more detail in U.S. Pat. Nos. 2,798,053; 3,915,921; 4,267,103; 5,288,814; and 5,349,030 hereby incorporated by reference. The term polyacrylic acid is used to include various homopolymers, copolymers, and interpolymers, wherein preferably at least 50 or 75 mole percent of the repeating units have pendant carboxylic acid groups or anhydrides of dicarboxylic acid groups. While acrylic acid is the most common primary monomer used to form polyacrylic acid the term is not limited thereto but includes generally all .alpha.-.beta. unsaturated monomers with carboxylic pendant groups or anhydrides of dicarboxylic acids as described in U.S. Pat. No. 5,349,030. Methods of producing polyacrylic acids are described in the references cited.

The pre-coat layer polyelectrolyte may also be in the form of a polyelectrolyte complex (PEC), which will form when oppositely charged polyelectrolytes are dissolved and/or mixed in solutions. Usually a PEC is made up of entangled polyanions and polycations (or polyacids and polybases) that have reacted together to form a conglomeration of polymer chains. The entangled polymer PEC can form the pre-coat layer of the invention.

Preparation of the Pre-Coat Layer from Pre-Coat Polymers

The pre-coat layer on the material surface may be formed by any of a number of chemisorption reactions. For example the pre-coat layer may be formed or attached to the material surface by utilizing a condensation reaction between a reactive group such as a hydroxyl group exposed on the material surface and a hydrolyzing functional group as the reactive moiety in the polymeric material that is to form the pre-coat layer. By allowing a chemical reaction between the reactive moieties in the pre-coat layer polymer and the activated material surface, a chemical bond such as —Si—O—, —Ge—O—, —Ti—O—, etc., may formed.

Also, in place of the above-described polymeric material having a hydrolyzing functional group, a reactive moiety having a thiol group can be used. By allowing a chemical reaction between the reactive moieties in the pre-coat layer polymer with the activated material surface, a covalent bond by —S— is formed in this way.

The skilled person is well aware of the various possibilities of attaching polymers to activated surfaces. These techniques generally involve the introduction of amino-, silane-, thiol-, hydroxyl- and/or epoxy-functionalities in either or both of the reactants to be bonded.

As a general bonding mechanism, the pre-coat polymers preferably comprise a reactive cationic moiety capable of reacting with a reactive nucleophilic moiety associated with the material surface, or vice versa. "Reactive cationic moiety" and "reactive nucleophilic moiety" refer to moieties which will react with each other at conditions not deleterious to the characteristics of the resulting product. The reaction of the cationic moiety with the nucleophile is one which results in the formation of covalent bonds with extinction or elimination of the cationic charge. Suitable reactive cationic moieties and reactive nucleophilic moieties are described hereinbelow in the section on brush polymer bonding. The reactive moieties mentioned there are equally suitable for use as reactive moieties for bonding the pre-coat layer to the material surface. Preferred pendant reactive moieties in the pre-coat polymer are carboxyl moieties. In one preferred embodiment of a method of the invention, the material surface is modified by aminoalkylsilane treatment, followed by contacting the thus functionalized material surface with a pre-coat polymer having multiple carboxylic group functionalities. Preferably a small (<10%) amount of these groups is reacted with the amino functionalities of the material surface. The remaining carboxylic groups can then be used to attach the brush polymers.

It is preferred that a pre-coat polymer, once attached to the material surface, still has a high density of unreacted reactive groups to which brush polymers can be attached. By providing a high density of reactive moieties exposed or pendant from the material surface, the pre-coat layer provides for a high density of sites for potential brush polymer attachment. In this way high grafting densities may be obtained.

The pre-coat layer may consist of cross-linked polymeric material. Preferably, the molecular configuration of the pre-coat polymer is such that, when attached to the surface, the number of exposed pendant reactive groups is maximized. A suitable configuration may depend on the polymer and its functionality. In general the random coil configuration of the polymer is suitable.

The pre-coat layer can be formed by various coating techniques such as spin coating, blade coating, wire-bar coating, spray coating, dip coating, bead coating, air knife coating, curtain coating, etc. For several of the above coating techniques it is suitable that the pre-coat polymer is contacted with the activated surface in the form of a solution comprising the said polymer. Thus, very suitably, a solvent is used for preparing a coating liquid including the pre-coat polymer in an organic solvent, such as, methanol, ethanol, n-propanol, n-butanol, benzyl alcohol, methyl cellosolve, ethyl cellosolve, acetone, methyl ethyl ketone, cyclohexanone, chlorobenzene, methyl acetate, n-butyl acetate, dioxane, tetrahydrofuran, methylene chloride, chloroform, etc., depending on the specific polymer used. The organic solvents may be used singly or as a mixture of two or more kinds thereof. It is proper that the thickness of the pre-coat layer is from 0.001 to 10 $\mu$m, preferably from 0.005 to 5 $\mu$m and even more preferably from 0.01 to 1.0 $\mu$m.

The bonding reaction can suitably be performed at a temperature of 10-150° C., preferably 60-100° C., or 120-130° C. for 0.1-2 hr at atmospheric pressure or at a reduced pressure of 100-500 mbar, for instance at 150° C. for 2 hr at 300 mbar.

A suitable concentration for the pre-coat layer polymer in an application solution is about 1 to 20 weight percent, based on the weight of the solution. A suitable solvent for poly-acrylic acid is for instance ethanol.

Preparation of the Pre-Coat Layer from Pre-Coat Polymer Precursors

The pre-coat may be formed by contacting the optionally activated and optionally functionalized material surface with a polymeric material, for instance in the form of a solution. Alternatively, the pre-coat layer may be formed by building the pre-coat layer by polymerization of monomeric precursors, i.e. polymerizable monomers, onto the material surface. This may for instance be accomplished by contacting the surface with polymerizable monomers, for instance in the form of a solution of polymerizable monomers. The term "monomers," as used herein, can also represent dimers, trimers, resins, resin components or any other polymerizable component.

Examples of polymerizable monomers for the formation of pre-coat polymers include, but are not limited to acrylic monomers such as acrylic acid and its esters, such as acrylic acid methyl ester, acrylic acid ethyl ester and butyl acrylate. Acrylic monomers are highly reactive chemicals. For example, individual molecules of acrylic acid or esters readily combine with themselves or other monomers to form long chains of repeating units, or polymers, by a process referred to as free radical polymerization.

The skilled person will appreciate that other pre-coat polymers as described above may similarly be prepared by polymerization of monomers, by methods generally available to the skilled person.

Apart from using the conventional wet-chemical techniques for deposition of the pre-coat layer, the pre-coat layer may be formed by using chemical vapor deposition (CVD), plasma deposition, plasma assisted grafting, or plasma polymerization techniques. These techniques may for instance optionally be used in combination with plasma activation of the material surface as described above in the section on the "Material surface". As used herein "plasma activation" comprises the introduction of new functional groups onto the surface, and refers to a method of making the surface suitable for the covalent attachment of a surface-modifying functionality or (directly) of a pre-coat polymer, i.e. providing the surface with reactive chemical groups. Properties of the surface then depend on the nature of the chemical groups. "Plasma-assisted grafting" is a two-step process in which the plasma activation is followed by the exposure to a liquid or gaseous precursor, e.g. a monomer. The monomer then undergoes a conventional free radical polymerization on the activated surface. In "plasma polymerization", a monomer is introduced directly into the plasma and the polymerization occurs in the plasma itself. The latter technique comprises activation of one or more precursors in an ionizing plasma such as to create radicals that react to form the pre-coat molecules, which upon deposition onto the surface form the pre-coat layer. Such techniques are well known to the skilled person. As an example the formation of a polyacrylic acid-based pre-coat layer may be performed by plasma polymerization. CVD or plasma techniques are ultimately suitable for providing flexibility in surfaces to be treated. For instance the coating of non-flat surfaces is more readily accomplished by using the herein proposed CVD and plasma techniques than, for instance, the spin-coating technique. Textiles and other fibers or tube-like surfaces may readily be provided with a pre-coat according to the present invention by using CVD or plasma techniques. Surface dielectric barrier discharge (SDBD) plasmas may for instance be used to generate surface radicals by the plasma activation, which can then be utilized as reactive species for subsequent acrylic acid (AAc) grafting in solution. Details of such plasma-assisted grafting procedures are for instance described in Čerňáková et al, Plasma Chemistry and Plasma Processing, Vol. 25(4), 2005, pp. 427-37, which is incorporated herein by reference in its entirety. By using such methods homogenous and stable layers of poly-AAc may be formed on the surface to be treated as a pre-coat layer. Plasma-assisted grafting exemplifies a method for preparation of the pre-coat layer from pre-coat polymer precursors as described in this section and represents step (a)(ii) of a method of the present invention as set forth herein, of contacting an optionally (and preferably) activated and optionally (and preferably) functionalized material surface with: polymerizable monomers under conditions wherein said monomers polymerize to form a polymeric material having a polymeric backbone with pendant reactive moieties wherein said polymeric material forms on said surface a pre-coat layer of chemisorbed polymeric material having pendant reactive moieties for the covalent bonding of terminally-functionalized polymer chains to said pre-coat layer.

In both procedures for preparation of the pre-coat layer, the material surface is contacted with an effective amount of said polymeric material or said polymerizable monomers, in order to allow for the formation of a pre-coat layer as defined herein, under conditions that allow for the reaction of reactive groups of the polymeric material to bond to the chemical groups of the surface material, or under conditions that allow for the reaction of reactive groups of the monomers to polymerize with each other and allow for the reaction of reactive groups of the polymeric material thus formed to bond to the chemical groups of the surface material, or under conditions that allow for the reaction of reactive groups of the monomers to bond to the chemical groups of the surface material and for the subsequent polymerization of additional monomers to the surface-attached monomer.

The plasma may for instance be formed by exposing a mixture of acrylic acid and nitrogen in a vapour or gaseous form to a high electric field. Amounts of the various components that make up the plasma are well known to the skilled person. The reactions for preparation of the pre-coat layer by these methods can suitably be performed at a temperature of the material surface of 10-150° C., preferably 20-100° C. for a duration of 1 second-20 minutes at atmospheric pressure or at a reduced pressure of 0.01-500 mbar.

Bonding of Brush Polymers to the Pre-Coat Layer

The end-functionalized polymer chains are bonded to the material surface by a pre-coat layer to provide high-density adhesion of the polymer chains to the materials surface. The brush polymers are terminally functionalized such that bonding to the pre-coat layer by reaction to the reactive moieties of the polymeric material is facilitated. The functionalization is preferably chosen such that reaction with the reactive moieties of the pre-coat layer polymers results in covalent bonds between the reactants. The brush polymers may thus be attached to the pre-coat layer on the material surface by any of a number of chemisorption reactions. For example the brush polymers may be attached to the pre-coat layer by utilizing a condensation reaction between a reactive group such as a terminal hydroxyl group exposed at one end of the chain of the brush polymer and a hydrolyzing functional group as the reactive moiety in the polymeric material that is to form the pre-coat layer, or vice versa.

The reactive moiety in the polymeric material is suitably a nucleophilic moiety such as an amino group, thiol group, hydroxyl group, etcetera. The brush polymers may suitable feature electrophilic groups such as epoxy, aldehyde, carboxylic ester, iso(thio)cyanate, etcetera as terminal functionalities. Also methyleen, vinyl or allyl groups may also be used as reactive nucleophilic moieties.

Generally speaking, the terminal functionality of the brush polymers preferably comprises a reactive cationic moiety capable of reacting with any one of a multitude of reactive nucleophilic moieties associated with the pre-coat polymer, or vice versa. The reactive cationic moieties used herein are selected from compounds and groups generally well-known in the art. These compounds or groups preferably consist of at least one moiety containing a heteroatom bearing a positive charge selected from nitrogen, phosphorus, oxygen, sulfur or iodine. Other operable cations can be selected from Groups 15 and 16 of the periodic table, but are generally not preferred. These cationic groups are also referred to collectively as "onium groups". Preferred cationic moieties include sulfonium, quaternary ammonium, phosphonium, pyridinium, thiazolinium, imidazolinium, sulfoxonium, isothiouronium, azetidinium, or diazonium groups. Techniques and processes for making compounds bearing the desired moieties are well-known in the prior art. Especially preferred cationic reactants contain a cationic sulfur or nitrogen moiety which is bonded to carbon atoms and optionally one heteroatom (N, O or S). A counter-ion (anion) will be present to balance a cationic charge. The identity of the anion is generally not critical, so long as the counter-ion does not deleteriously affect the products to be formed. Generally, chloride, hydroxide and bicarbonate salts are preferred, with carboxylate salts being most preferred.

A reactive nucleophilic moiety as the term is used herein refer to compounds which react with the reactive cationic moieties described hereinbefore to yield products by formation of covalent bonds with extinction of cationic charge. These reactants are well known, as illustrated in J. March, Advanced Organic Chemistry, 3rd Ed., John Wiley & Sons, pp. 255-446 and 576-607 (1985). Generally, the nucleophilic moiety reacts in a conventional nucleophilic displacement to form a covalent bond with a carbon atom originally bound to a heteroatom in the cationic moiety. Not all nucleophilic moieties will react with any reactive cationic moiety under conditions suitable for the formation of the polymer brush of the instant invention and which are not deleterious to the polymers involved. The selection of a nucleophilic reactant requires consideration of the type of non-ionic bond desired, the reactivity of the cationic compound, and the process and conditions employed.

Reactive nucleophilic moieties useful in the subject invention can generally be selected from one of three groups: (1) nucleophilic anions of inorganic acids or water, such as bromide, chloride, iodide, hydroxide, fluoride, alkoxides, azide, sulfite, bisulfite, phosphate, phosphite, hydrosulfite, sulfide, cyanide, cyanate and thiocyanate; (2) nucleophilic anions derived from compounds bearing active hydrogens, such as the conjugate bases of carboxylic acids, organic phosphonic acids, alcohols, phenols, mercaptans, thiophenols, amides, sulfonamides and phosphoric acid partial esters; and (3) primary or secondary amines, such as compounds bearing a single amine group and compounds such as meta-phenylene diamine, methylene dianiline, ethylene diamine, diethylene triamine and other polyamines. Polymeric amines, e.g., polyethylenimine and hydrolyzed poly(ethyl-2-oxazoline), may also be used as reactive groups. Alkyl sulfides, carboxylates and ammonia are other suitable nucleophilic groups.

Any of the foregoing nucleophilic groups can bear substituents which do not deleteriously affect the material surface or polymers involved. Desirably, nucleophilic anions are selected that form adducts with one of the substituents on a heteroatom of the cationic compound, when the cation and nucleophile are in contact with each other at the interface of the pre-coat layer and the brush polymer melt at a temperature above the glass transition temperature of the brush polymer.

As a nucleophile the carboxyl group is preferred. Reactants bearing a plurality of anionic organic nucleophilic moieties, i.e., polyfunctional nucleophiles, are especially preferred as these result in very stable polymer brushes. Both for the surface/pre-coat polymer bond as well as for the pre-coat polymer/brush polymer bond, a very suitable nucleophile/cation combination is formed by carboxyl/amine combination which, when reacted together form the amide bond. Pre-coat polymers having a plurality of carboxyl groups are readily available, such as for instance polyacrylic acid. Therefore, very suitable terminal groups of the brush polymer are formed by amines.

The brush polymers are utilized in the process for modifying materials surfaces of the instant invention alone without solvents in the form of a melt. A particular advantage of the use of the brush polymers in this form is that a brush with very high grafting density $\sigma$ can be obtained without compromising the attainable low "polydispersity" of the brush. For instance it has been found that grafting densities $\sigma$ of about 1 $nm^{-2}$ can be obtained by using the method of the present invention while at the same time a narrow molecular weight distribution Mw/Mn as low as 1.03 can be provided for.

In most all cases, the viscosity of the melt of brush polymers will be sufficiently low to allow its use without further modification. The viscosity of the melt may be controlled by selecting an appropriate size of the brush polymers. Preferably no solvent is used, so as to allow for the highest grafting densities.

The melt of brush polymers as used in a method of the present invention is characterized in that the polymer, preferably in pure form, is at a temperature above its glass transition temperature (or above its melting temperature), but below its degradation temperature.

The melt is preferably contacted with the pre-coat layer at a temperature of about 5-50° C. above the glass transition temperature of the polymer. In case of a segmented polymer or block-copolymer, the melt is preferably contacted with the pre-coat layer at a temperature of about 20° C. above the glass transition temperature of the low melting point block.

The reaction between the polymer melt and the pre-coat layer may be performed in an oven, at about 30 degrees above the melting temperature of the polymer, and optionally under a reduced pressure (e.g. 50-500 mbar, or 5-50 kPa). More details of the reaction conditions are provided in the Examples below.

General reaction conditions are 20 degrees C. above the Tg or Tm of the brush polymer at reduced pressure (300 mbar) for 3 hr.

The polymer brush-modified material surfaces of the present invention may be utilized for a wide variety of applications such as for chemical sensors, optical devices or controlled release agents. Preferred applications are medical devices, in particular medical intubation tubing, to which cell adhesion is to be avoided or minimized.

Also very suitable applications are wound dressings or stents having a degradable brush of, for instance degradable PEO, polyurethane or polyester or combinations thereof or any other degradable chain-like polymer capable of forming the brush. Such a degradable brush will on the one hand prevent the adhesion of cells or of drying wound fluids to the dressing or stent while at the same time it may, upon degradation, provide for the controlled release of a medicament physisorbed of chemisorbed to the brush polymers.

The degradability of a brush of the present invention may be controlled for instance by selecting the polymeric bonds between the various reactants that form the brush of the present invention in relation to the environment. For instance, ester bonds are readily degraded by esterases of the human body, while amide bonds will result in a more stable brush under the same conditions. Also, the degradability of the brush may be controlled by controlling hydrophilicity and molecular weight of the polymers in the brush.

The advantage of the presence of a pre-coat layer between the brush polymers and the material surface is that the brush coating can be applied to any surface, e.g. to metal or wood, as long as a pre-coat polymer can be made to bind the selected surface, e.g. by providing thereto reactive groups (e.g. aminosilane groups) capable of bonding to the surface, e.g. optionally via reactive moieties introduced previously at the surface by activation thereof. Activation of the surface may for instance be attained by e.g. plasma treatment, corona treatment, flame treatment (preferred for treatment of polymer surfaces). The type of treatment depends on the material to be modified. Teflon, may for instance be etched chemically, e.g. with a strong base (e.g. a sodium hydroxide soln. at pH 14).

The present invention further relates to method for producing a polymer brush according to the present invention, comprising binding the pre-coat polymeric material as defined herein above to a material surface to form a pre-coat layer and binding terminally-functionalized polymer chains to said pre-coat layer to form the tethered polymer chains of the brush.

Alternatively, a method of the present invention may comprise contacting in succession or simultaneously an optionally activated and optionally functionalized material surface, a solution of a polymeric material having a polymeric backbone with pendant reactive moieties, and a melt of brush-forming terminally-functionalized polymer chains as defined hereinabove, in order to allow a covalent bonding reaction to occur between surface and polymers, wherein upon completion of the reaction, the polymeric material forms a layer between the material surface and the brush polymer chains. In this The invention will now be illustrated by way of the following non-limiting examples.

EXAMPLES

Example 1

In this experiment, a method of modifying a glass surface by covalent bonding thereto of, subsequently, an aminopropyltriethoxysilane linker, a polyacrylic acid pre-coat polymer and an octadecylamine brush polymer is described.

The pre-cleaned glass substrates were submerged in a fresh coating solution of 5% 3-aminopropyltriethoxysilane in $H_2O$ and sonicated for 20 min in an ultrasonic bath. The substrates were thoroughly washed (3×) with water followed by drying for 1 hr in an oven at 80° C. The thus functionalized substrates were dipped in a solution of polyacrylic acid (Mw 100,000) in water (1 wt %) and dried in an oven at 100° C. under reduced pressure (<100 mbar) for 4 hours. The substrates were thoroughly washed (3×) with chloroform to remove the non-attached polyacrylic acid. The substrate was covered with 1-octadecylamine (C18; Tm 52° C.) and placed in an oven under reduced pressure (80° C., 300 mbar) for 4 hours. The excess brush polymer was removed by washing the samples with chloroform.

Contact angle measurements of water on the brush showed an increase of contact angle from 2 degrees to 130 degrees.

Example 2

Using the same conditions as described in Example 1, a polypropylene chemical film having a thickness 22 μm (such as generally available from any supplier, e.g. from the Dow Chemical Company or from Goodfellow Cambridge Ltd., Huntingdon, UK) was first activated by corona treatment by using standard equipment comprising a high voltage (15,000-20,000 V) generator. The surface modification of the substrate showed an increase of the water contact angle indicating a modification of the surface. Surface modifications such as the present corona treatment are well within reach of the skilled person, and the level of modification can easily be selected for optimal bonding of the pre-coat layer.

The samples were subsequently functionalized with 3-aminopropyltriethoxysilane and further treated as described in Example 1.

Contact angle measurements of water on the brush showed an increase of contact angle to 115 degrees.

Example 3

Using the same conditions as described in Example 1, a polyterafluorethylene (Teflon®) surface was first activated by dipping the material in a KOH solution (20 wt %) for 2 minutes at elevated temperature (50 degrees C.) for 10 minutes followed by a functionalized with 3-aminopropyltriethoxysilane and further treated as described in Example 1.

Contact angle measurements of water on the brush showed an increase of contact angle to 105 degrees.

Example 4

Using the same conditions as described in Example 1, a polyurethane clear coat (silvatane PU acryl satin, Akzo-Nobel Decorative Coatings bv, Brink/Molyn—Trimetal, Groot-Ammers, The Netherlands) was first activated by corona discharge (see above) The samples were functionalized with 3-aminopropyltriethoxysilane and further treated as described in Example 1.

Contact angle measurements of water on the brush showed an increase of contact angle to 122 degrees.

The invention claimed is:

1. A method of preparing a polymer brush on a material surface comprising the steps of:
   a) contacting an optionally (and preferably) activated and optionally (and preferably) functionalized material surface with:
      i) a polymeric material having a polymeric backbone with pendant reactive moieties wherein said polymeric material reacts with said activated and optionally functionalized material surface to form on said surface a pre-coat layer of chemisorbed polymeric material having pendant reactive moieties for the covalent bonding of terminally-functionalized polymer chains to said pre-coat layer, or
      ii) polymerizable monomers under conditions wherein said monomers form a polymeric material having a polymeric backbone with pendant reactive moieties wherein said polymeric material reacts with said activated and optionally functionalized material surface to form on said surface a pre-coat layer of chemisorbed polymeric material having pendant reactive moieties for the covalent bonding of terminally-functionalized polymer chains to said pre-coat layer;
   (b) optionally removing unreacted polymeric or monomeric material;
   (c) contacting the resultant pre-coat layer with terminally-functionalized polymer chains having at least one terminal functional group, wherein said terminally-functionalized polymer chains are in the form of a melt when contacted with said pre-coat layer, and wherein said at least one terminal functional group reacts with at least one pendant reactive moiety to provide for tethered polymer chains covalently bonded to said pre-coat layer of polymeric material, and optionally removing unreacted polymer chains.

2. Method according to claim 1, wherein said polymeric material comprises at least one pendant reactive moiety per monomer.

3. Method according to claim 1, wherein said pendant reactive moieties are carboxyl moieties, wherein said at least one terminal functional group is the amine group, and wherein said material surface is activated by corona treatment and subsequently functionalized with aminoalkylsilane.

4. Method according to claim 3, wherein said polymeric material is a polyacrylic acid or a derivative thereof, wherein said terminally-functionalized polymer chains are 1-octadecylamine, and wherein said material surface is functionalized with 3-aminopropyltriethoxysilane.

5. Method according to claim 1, wherein said terminally-functionalized polymer chains are polymethacrylates chains, optionally further functionalized with methyl or ethyl quaternary ammonium chloride side groups.

6. Method according to claim 1, wherein said terminally-functionalized polymer chains are degradable polymer chains.

7. Method according to claim 6, wherein said method further comprises the steps of providing the tethered polymer chains with a controlled release functionality, preferably by chemisorbing or physisorbing a medicament to said tethered polymer chains.

8. Method according to claim 1, wherein said polymeric material is provided in the form of a solution in order to react with said optionally activated and optionally functionalized material surface.

9. Method according to claim 1, wherein said polymers in said melt have a polydispersity Mw/Mn of between 1.03 and 1.1, preferably of between 1.03 and 1.08.

10. Method according to claim 1, wherein said tethered polymer chains in said polymer brush have a polydispersity Mw/Mn of between 1.03 and 1.1, preferably of between 1.03 and 1.08, and wherein said polymer brush has a polymer density of between 0.5 $nm^{-2}$ and 2 $nm^{-2}$, preferably between 0.8 $nm^{-2}$ and 1.5 $nm^{-2}$.

11. A polymer brush on a material surface, said polymer brush consisting of tethered polymer chains covalently bonded to a layer of polymeric material positioned in between said tethered chains and said surface, wherein a plurality of tethered chains is bonded to a single polymer molecule of said polymeric material, and wherein said tethered chains in said polymer brush have a polydispersity Mw/Mn of between 1.03 and 1.1, preferably of between 1.03 and 1.08, and wherein said polymer brush has a polymer density of between 0.5 $nm^{-2}$ and 2 $nm^{-2}$, preferably between 0.8 $nm^{-2}$ and 1.5 $nm^{-2}$.

12. A polymer brush according to claim 11, wherein said polymeric material is derived from acrylic acid.

13. A polymer brush according to claim 12, wherein said covalent bonds between said polymeric material and said tethered chains is the amide bond.

14. A polymer brush according to claim 11, wherein said tethered polymer chains are selected from the group consisting of hydrocarbon polymers, polyacrylates, polyethers, polyesters, polycarbonate, polysulfone, polyamides, polyimides, polyurethane, polysiloxanes, cellulose, polypeptides and derivatives, copolymers thereof.

15. A polymer brush according to claim 11, wherein said tethered polymer chains are polymethacrylates functionalized with methyl or ethyl quaternary ammonium chloride side groups.

16. A polymer brush according to claim 11, wherein said tethered polymer chains are degradable and adapted for controlled release of medicaments.

17. A polymer brush according to claim 16, wherein said material surface is selected from part of a wound dressing or stent.

18. Method for producing a polymer brush according to claim 11, comprising binding the polymeric material to a material surface to form a pre-coat layer and binding terminally-functionalized polymer chains to said pre-coat layer to form the tethered polymer chains.

19. Method according to claim 2, wherein:
   said pendant reactive moieties are carboxyl moieties, wherein said at least one terminal functional group is the amine group, and wherein said material surface is activated by corona treatment and subsequently functionalized with aminoalkylsilane;
   said polymeric material is a polyacrylic acid or a derivative thereof, wherein said terminally-functionalized polymer chains are 1-octadecylamine, and wherein said material surface is functionalized with 3-aminopropyltriethoxysilane;

said terminally-functionalized polymer chains are polymethacrylates chains, optionally further functionalized with methyl or ethyl quaternary ammonium chloride side groups;

said terminally-functionalized polymer chains are degradable polymer chains;

said method further comprises the steps of providing the tethered polymer chains with a controlled release functionality, preferably by chemisorbing or physisorbing a medicament to said tethered polymer chains;

said polymeric material is provided in the form of a solution in order to react with said optionally activated and optionally functionalized material surface;

said polymers in said melt have a polydispersity Mw/Mn of between 1.03 and 1.1, preferably of between 1.03 and 1.08;

said tethered polymer chains in said polymer brush have a polydispersity Mw/Mn of between 1.03 and 1.1, preferably of between 1.03 and 1.08, and wherein said polymer brush has a polymer density of between 0.5 $nm^{-2}$ and 2 $nm^{-2}$, preferably between 0.8 $nm^{-2}$ and 1.5 $nm^{-2}$.

20. A polymer brush obtained by a method according to claim 19.

21. A polymer brush according to claim 13, wherein:

said tethered polymer chains are selected from the group consisting of hydrocarbon polymers, polyacrylates, polyethers, polyesters, polycarbonate, polysulfone, polyamides, polyimides, polyurethane, polysiloxanes, cellulose, polypeptides and derivatives, copolymers thereof;

said tethered polymer chains are degradable and adapted for controlled release of medicaments; and said material surface is selected from part of a wound dressing or stent.

22. Method for producing a polymer brush according to claim 21, comprising binding the polymeric material to a material surface to form a pre-coat layer and binding terminally-functionalized polymer chains to said pre-coat layer to form the tethered polymer chains.

23. A polymer brush according to claim 21, wherein said tethered polymer chains are polymethacrylates functionalized with methyl or ethyl quaternary ammonium chloride side groups.

* * * * *